United States Patent
Lin et al.

(10) Patent No.: US 12,006,749 B2
(45) Date of Patent: Jun. 11, 2024

(54) DISPLACEABLE ROTATING SHAFT STRUCTURE AND FOLDABLE DEVICE HAVING THE SAME

(71) Applicant: FOSITEK CORPORATION, New Taipei (TW)

(72) Inventors: Wen-Yen Lin, New Taipei (TW); Wei-Cheng Chien, New Taipei (TW)

(73) Assignee: Fositek Corporation, New Taipei (TW)

( * ) Notice: Subject to any disclaimer, the term of this patent is extended or adjusted under 35 U.S.C. 154(b) by 0 days.

(21) Appl. No.: 17/973,199

(22) Filed: Oct. 25, 2022

(65) Prior Publication Data

US 2024/0133221 A1 Apr. 25, 2024

(51) Int. Cl.
| | | |
|---|---|---|
| *E05D 11/08* | (2006.01) | |
| *E05D 3/02* | (2006.01) | |
| *E05D 11/06* | (2006.01) | |
| *E05D 7/04* | (2006.01) | |

(52) U.S. Cl.
CPC .............. *E05D 3/022* (2013.01); *E05D 11/06* (2013.01); *E05D 11/08* (2013.01); *E05D 2007/0484* (2013.01); *E05Y 2900/606* (2013.01)

(58) Field of Classification Search
CPC ........... E05D 3/02; E05D 3/022; E05D 11/06; E05D 11/08; E05D 11/081; E05D 11/084; E05D 11/087; E05D 11/088; E05D 11/1028; E05D 2007/0484; E05D 16/337–34; E05D 16/357; E05D 16/359; E05D 16/361; G06F 1/1616; G06F 1/1681; E05Y 2900/606

See application file for complete search history.

(56) References Cited

U.S. PATENT DOCUMENTS

| | | | | |
|---|---|---|---|---|
| 7,520,026 B1 * | 4/2009 | Lin | .......................... | E05D 11/06 16/337 |
| 7,921,515 B2 * | 4/2011 | Chiang | .................. | G06F 1/1616 16/337 |
| 8,015,668 B2 * | 9/2011 | Wang | ..................... | G06F 1/1681 16/338 |
| 8,069,534 B2 * | 12/2011 | Wang | ..................... | G06F 1/1616 16/374 |
| 8,302,260 B2 * | 11/2012 | Chen | ...................... | G06F 1/1681 16/303 |

(Continued)

*Primary Examiner* — Chuck Y Mah
(74) *Attorney, Agent, or Firm* — Rosenberg, Klein & Lee

(57) ABSTRACT

A displaceable rotating shaft structure and a foldable device having the rotating shaft structure are disclosed. The displaceable rotating shaft structure comprises a support, a rotating shaft, a connecting rod assembly, a guide assembly, and a torsion assembly. The support has a supporting portion. The connecting rod assembly has a first outer end that is rotatably connected to the linking section of the rotating shaft and a second outer end that is pivotally connected to the supporting portion. The guide assembly has a guide rod. The guide rod is configured to displace relative to the supporting portion. When the rotating shaft is rotated, the rotating shaft drives the connecting rod assembly to adjust the angle and the total length of a joint of connecting rods of the connecting rod assembly, a distance between the rotating shaft and the support is changed through the guide assembly.

20 Claims, 5 Drawing Sheets

(56) References Cited

U.S. PATENT DOCUMENTS

| | | | | |
|---|---|---|---|---|
| 8,713,757 B2* | 5/2014 | Chen | .................... | G06F 1/1616 |
| | | | | 16/327 |
| 9,624,704 B1* | 4/2017 | Hsu | ...................... | E05D 11/087 |
| 2005/0278895 A1* | 12/2005 | Su | ......................... | E05D 11/087 |
| | | | | 16/340 |
| 2010/0275412 A1* | 11/2010 | Wang | .................... | G06F 1/1616 |
| | | | | 16/297 |
| 2014/0331452 A1* | 11/2014 | Zhang | ................... | G06F 1/1681 |
| | | | | 16/337 |
| 2017/0139446 A1* | 5/2017 | Lan | ......................... | E05D 3/18 |
| 2022/0269315 A1* | 8/2022 | Tsai | ..................... | G06F 1/1616 |

* cited by examiner

DISPLACEABLE ROTATING SHAFT STRUCTURE AND FOLDABLE DEVICE HAVING THE SAME

FIELD OF THE INVENTION

The present invention relates to a displaceable rotating shaft structure and a foldable device having the displaceable rotating shaft structure, and more particularly to a rotating shaft structure that can adjust the distance between two rotating shafts along with opening and closing of two parts of an electronic device and keep each linking mechanism in a state of minimum friction in operation.

BACKGROUND OF THE INVENTION

Taiwan Patent Application Publication No. 202221236 discloses a pivot module and an electronic device. The pivot module includes a restricting seat, a sliding seat, at least one connecting rod assembly, and a rotating shaft. Both sides of the restricting seat are provided with two fixed plates parallel to each other. A plurality of fasteners are provided and inserted through the two fixed plates for locking the two fixed plates to the top of a first body of the electronic device. The sliding seat is movably disposed on the restricting seat. The connecting rod assembly is connected to the restricting seat and the sliding seat. The connecting rod assembly is configured to transmit external force and drive the sliding seat to generate displacement. The rotating shaft passes through the connecting rod assembly and the sliding seat, and the rotating shaft is connected to a support. When the first body of the electronic device and the support are moved (opened or closed) relative to each other, the support drives the rotating shaft to rotate relative to the sliding seat and applies force to the connecting rod assembly for driving the sliding seat to move along the restricting seat, so that the edge of the support can be relatively far away from or close to the heat dissipation area of the first body of the electronic device.

However, as shown in the drawings of the above-mentioned patent application, the extension portion of the rotating shaft has a circular cross-section. The second connecting rod of the connecting rod assembly has a circular hole for receiving the extension portion of the rotating shaft. Therefore, the extension portion of the rotating shaft does not have a mechanism to drive the second connecting rod of the connecting rod assembly to rotate. There is no description in the specification about the driving method of the second connecting rod. It is difficult to implement the above-mentioned invention.

Furthermore, in the above-mentioned invention, there is no relevant mechanism for elastically pressing the connecting rod assembly and the sliding seat, so that the frictional resistance between the support and the first body of the electronic device is small. In practical application, the support cannot be positioned at a desired open angle. When the open angle is less than 90 degrees, the support may have an action of automatically closing down, resulting in a lack of application.

Taiwan Patent Publication No. 1715198 discloses a rotating shaft module and a portable electronic device. The rotating shaft module includes a first support, a second support, a first rotating shaft, a pivot member and a connecting rod. The first rotating shaft is disposed on the first support mounted to a first body of the portable electronic device. The pivot member is disposed on the second support mounted to a second body of the portable electronic device. The first support has a vertical plate. The vertical plate has a rail and a positioning hole. The first rotating shaft has a positioning portion and a shaft portion. The positioning portion is positioned in the positioning hole. The connecting rod includes a first end and a second end opposite to the first end. The first end is pivotally connected to the shaft portion of the first rotating shaft. The second support has an extension portion pivotally connected to the second end of the connecting rod. The extension portion has a shaft hole. The pivot member has a moving portion and a shaft portion. The shaft portion passes through the shaft hole. The moving portion is movably inserted into the rack of the first support. The rotating shaft module further includes a torsion assembly. When the second support and the pivot member are relatively pivoted, the torsion force between the second support and the pivot member is provided by the friction force generated by the torsion assembly.

In operation, when the first and second bodies are in a closed state, the extension portion of the second support and the connecting rod are in a fully extended position, so that the distance between the pivot member and the first rotating shaft is the maximum value. As the first body is pivoted and opened relative to the second body, the extension portion of the second support and the connecting rod are gradually retracted relative to each other. After the first and second bodies are fully opened, the pivot member is close to the first rotating shaft so that the distance between the pivot member and the first rotating shaft is the minimum value. This rotating shaft module functions as a connecting rod mechanism. When the pivot member is moved closer to or away from the first rotating shaft as the second support is rotated relative to the first support. In the process of opening and closing the first body relative to the second body, it can avoid the situation that the mechanism is easily interfered by a fixed-type rotating shaft or a rotating shaft with a fixed distance, so that the first body can be smoothly rotated and opened/closed relative to the second body.

However, in the above structure, because the torsion member of the torsion assembly acts directly on the axial direction of the pivot member, greater frictional force will be generated between the abutting portion of the pivot member and the extension portion of the second support. This frictional force not only causes resistance when the first and second bodies are opened and closed but also causes serious wear on the extension portion of the second support to affect the service life of the entire rotating shaft module.

Accordingly, the inventor of the present invention has devoted himself based on his many years of practical experiences to solve these problems.

SUMMARY OF THE INVENTION

The primary object of the present invention is to provide a displaceable rotating shaft structure and a foldable device having the rotating shaft structure. The displaceable rotating shaft structure comprises a support, a rotating shaft, a connecting rod assembly, a guide assembly, and a torsion assembly. The support has a supporting portion. The rotating shaft has a linking section and a fixed section at both ends thereof. The connecting rod assembly has a first outer end and a second outer end. The first outer end is rotatably connected to the linking section. The second outer end is pivotally connected to the supporting portion. The guide assembly has a guide rod. One end of the guide rod is pivotally connected to the linking section and located between the connecting rod assembly and a torsion assembly. The guide rod has at least one guide portion. The guide portion is configured to guide the guide rod to slide relative to the supporting portion. The torsion assembly is located between the guide rod and the distal end of the linking section. When the rotating shaft is rotated relative to the support, the rotating shaft drives the connecting rod assembly to adjust the angle and the total length of a joint of connecting rods of the connecting rod assembly relative to the rotating shaft, a distance between the rotating shaft and the support is changed through the guide assembly, the torsion assembly and the connecting rod assembly are spaced by the guide assembly so that the torsion assembly and the connecting rod assembly can be driven under low frictional resistance.

Preferably, the connecting rod assembly includes a first connecting rod and a second connecting rod having a first end pivotally connected to the first connecting rod. One end of the first connecting rod, close to the second connecting rod, has a notch. A pivot portion is disposed in the notch and pivotally connected to the second connecting rod. The notch has a depth greater than a thickness of the second connecting rod. When the second connecting rod is pivoted relative the first connecting rod, the joint of the first and second connecting rods has the smallest contact friction area and the lowest friction resistance, which can further increase the service life of the entire connecting rod assembly.

Embodiments of the present invention will now be described, by way of example only, with reference to the accompanying drawings.

DETAILED DESCRIPTION OF THE PREFERRED EMBODIMENTS

Figure 1:
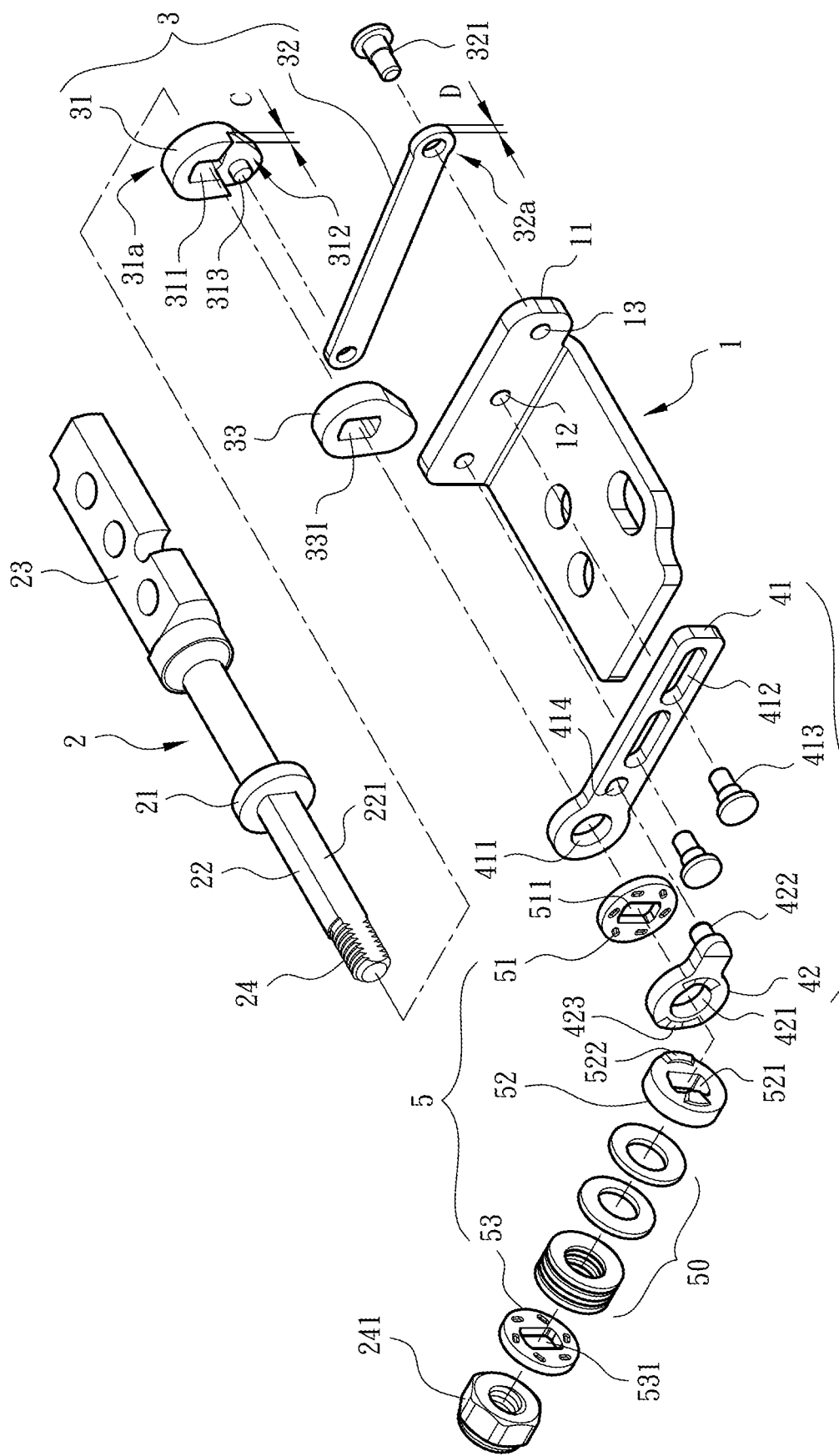
FIG. 1 is an exploded view of the present invention.
Figure 2:
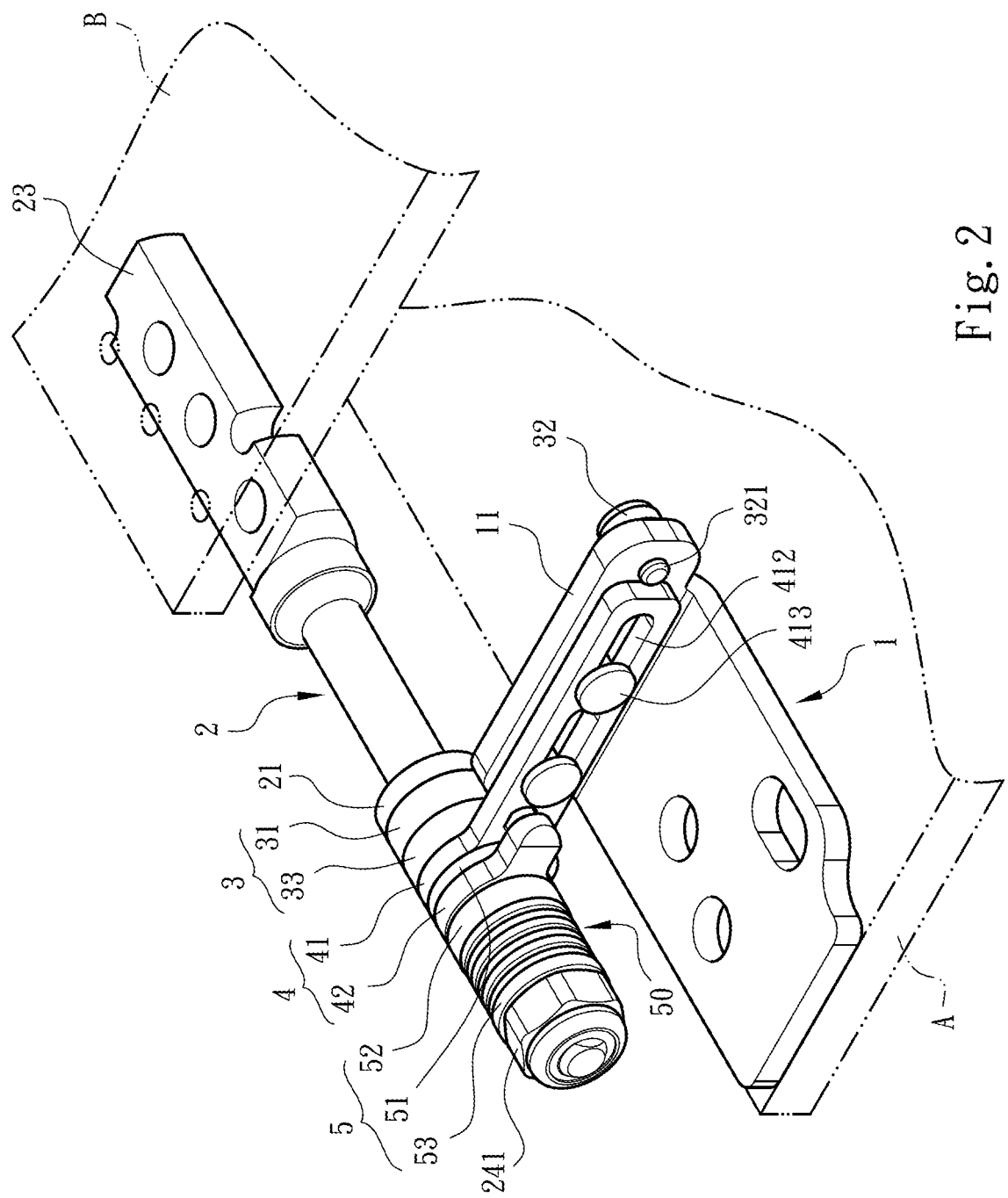
FIG. 2 is a schematic view of the present invention coupled to related units.

Referring to FIG. 1 and FIG. 2, the main structure of the present invention comprises a support 1, a rotating shaft 2, a connecting rod assembly 3, a guide assembly 4, and a torsion assembly 5. The support 1 is coupled to a preset immovable unit A (such as a host body) of an electronic device (which may be a notebook computer or similar electronic products). The support 1 has an upright supporting portion 11. The supporting portion 11 has at least one positioning hole 12 and a pivot hole 13.

The rotating shaft 2 has a stop flange 21 around the middle section of the rotating shaft 2, a fixed section 23 that is located at one side of the stop flange 21 and coupled to a preset movable unit B (such as a screen) of the electronic device, and a linking section 22 that is located at the other side of the stop flange 21. The periphery of the linking section 22 has at least one flat surface 221, so that the radial cross-section of the linking section 22 is non-circular. One end of the linking section 22, away from the stop flange 21, is defined as a locking end 24 (which may be an external thread). A locking member 241 (which may be a nut) is provided on the locking end 24.

The connecting rod assembly 3 includes a first connecting rod 31 and a second connecting rod 32 having a first end pivotally connected to the first connecting rod 31. One end of the first connecting rod 31, away from the second connecting rod 32, is defined as a first outer end 31a. The first outer end 31a is connected to the linking section 22 for rotation therewith. A second end of the second connecting rod 32, away from the first connecting rod 31, is defined as a second outer end 32a. The second outer end 32a is pivotally connected to the supporting portion 11.

In this embodiment, the first outer end 31a of the first connecting rod 31 has a linking hole 311 corresponding in shape to the radial cross-section of the linking section 22. The linking section 22 is inserted in the linking hole 311, so that the first connecting rod 31 can be pivoted synchronously along with rotation of the rotating shaft 2. The second outer end 32a of the second connecting rod 32 is pivotally connected to the pivot hole 13 via a pivot member 321.

Furthermore, the other end of the first connecting rod 31, close to the second connecting rod 32, has a notch 312. A pivot portion 313 (which may be a protruding post) is disposed in the notch 312 and pivotally connected to the first end of the second connecting rod 32. A stopper 33 is connected to one side of the notch 312. The stopper 33 has a linking hole 331 for insertion of the linking section 22 and covers the pivot portion 313. The depth C between the bottom of the notch 312 and the stopper 33 (the top edge of the notch 312) is greater than the thickness D of the first end of the second connecting rod 32, so that when the second connecting rod 32 is pivoted, it will not rub against the bottom of the notch 312 and the stopper 33.

The guide assembly 4 has a guide rod 41. One end of the guide rod 41 has a circular shaft hole 411. The linking section 22 is pivotably connected to the shaft hole 411. The guide rod 41 has at least one guide portion 412 (which may be a guide groove). A guide member 413 is inserted through the guide portion 412 (the guide groove) and secured to the positioning hole 12 to form a guide for the guide rod 41 to slide relative to the supporting portion 11.

In a feasible embodiment, the guide assembly 4 further includes a linking member 42. The linking member 42 has a shaft hole 421 for insertion of the linking section 22. One side of the linking member 42, facing the guide rod 41, has a protrusion 422. The guide rod 41 has a linking portion 414. The protrusion 422 is engaged in the linking portion 414, so that the linking member 42 is connected to the guide rod 41 to be driven synchronously.

The torsion assembly 5 is coupled to the linking section 22 and is located between the guide rod 41 and the locking end 24 of the linking section 22. At least one part of the torsion assembly 5 is pivoted synchronously along with the rotating shaft 2 to generate friction with the guide assembly 4 for providing the pivoting torque of the shaft 2.

In this embodiment, the torsion assembly 5 is composed of an elastic member assembly 50 and a plurality of friction members 51, 52, 53 having high friction coefficients. The friction members 51, 52, 53 have linking holes 511, 521, 531 (corresponding in shape to the radial cross-section of the linking section 22). The linking section 22 is inserted in the linking holes 511, 521, 531 so that the friction members 51, 52, 53 interact with the rotating shaft 2. The elastic member assembly 50 is configured to generate an elastic force on the friction members 51, 52, 53/or the friction members 51 along the axial direction of the rotating shaft 2 to increase the friction between the friction members 51, 52, 53 and between the guide assembly 4.

In a feasible embodiment, the friction member 51 is disposed between the guide rod 41 and the linking member 42, the friction member 52 is disposed between the linking member 42 and the elastic member assembly 50, and the friction member 53 is disposed between the locking member 241 and the elastic member assembly 50. When the friction members 51, 52, 53 are pivoted synchronously along with the rotating shaft 2, they can generate friction with the guide assembly 4 and the locking member 241. At least one first engaging portion 423 (which may be a concave portion or a convex portion) is disposed on a surface of the linking member 42, facing the friction member 52, as required. A second engaging portion 522 (which may be a convex portion or a concave portion) is disposed on the adjacent friction member 52. When the friction member 52 is pivoted to a predetermined angle along with the rotating shaft 2, the second engaging portion 522 and the first engaging portion 423 are engaged with each other, so that the movable unit B and the immovable unit A can be positioned at a specific open angle.

Figure 3:
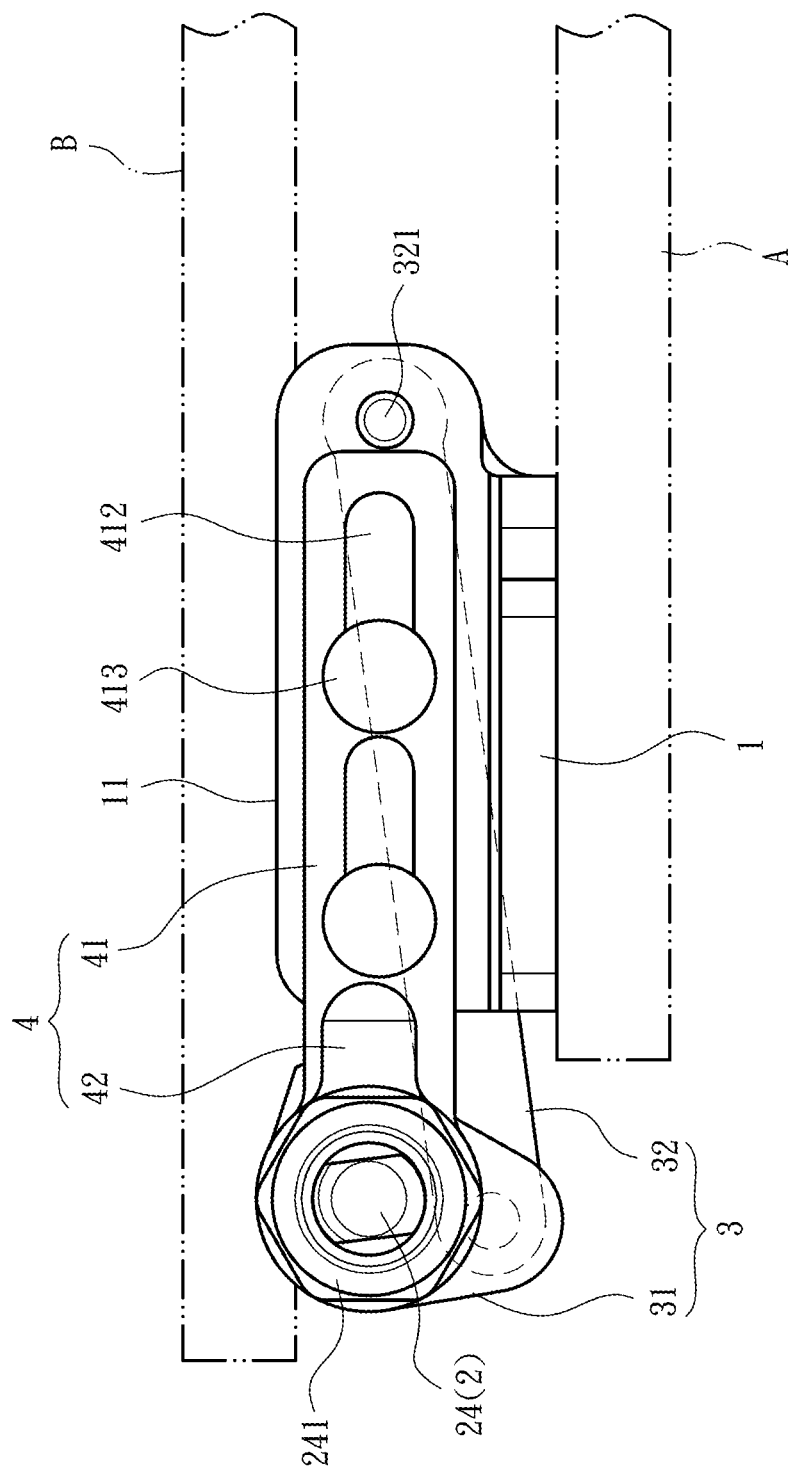
FIG. 3 is a first schematic view showing the operation of the present invention.
Figure 4:
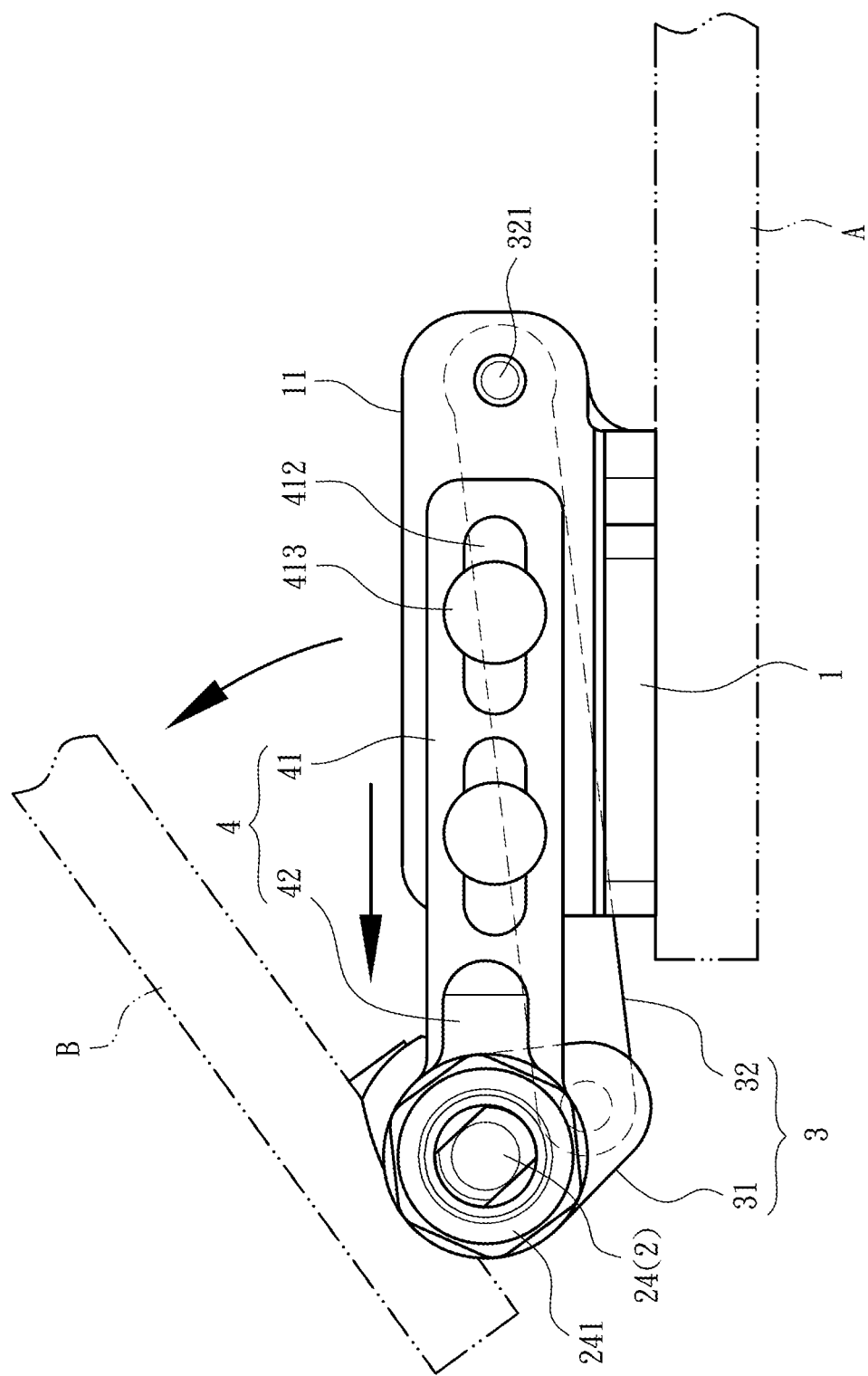
FIG. 4 is a second schematic view showing the operation of the present invention.
Figure 5:
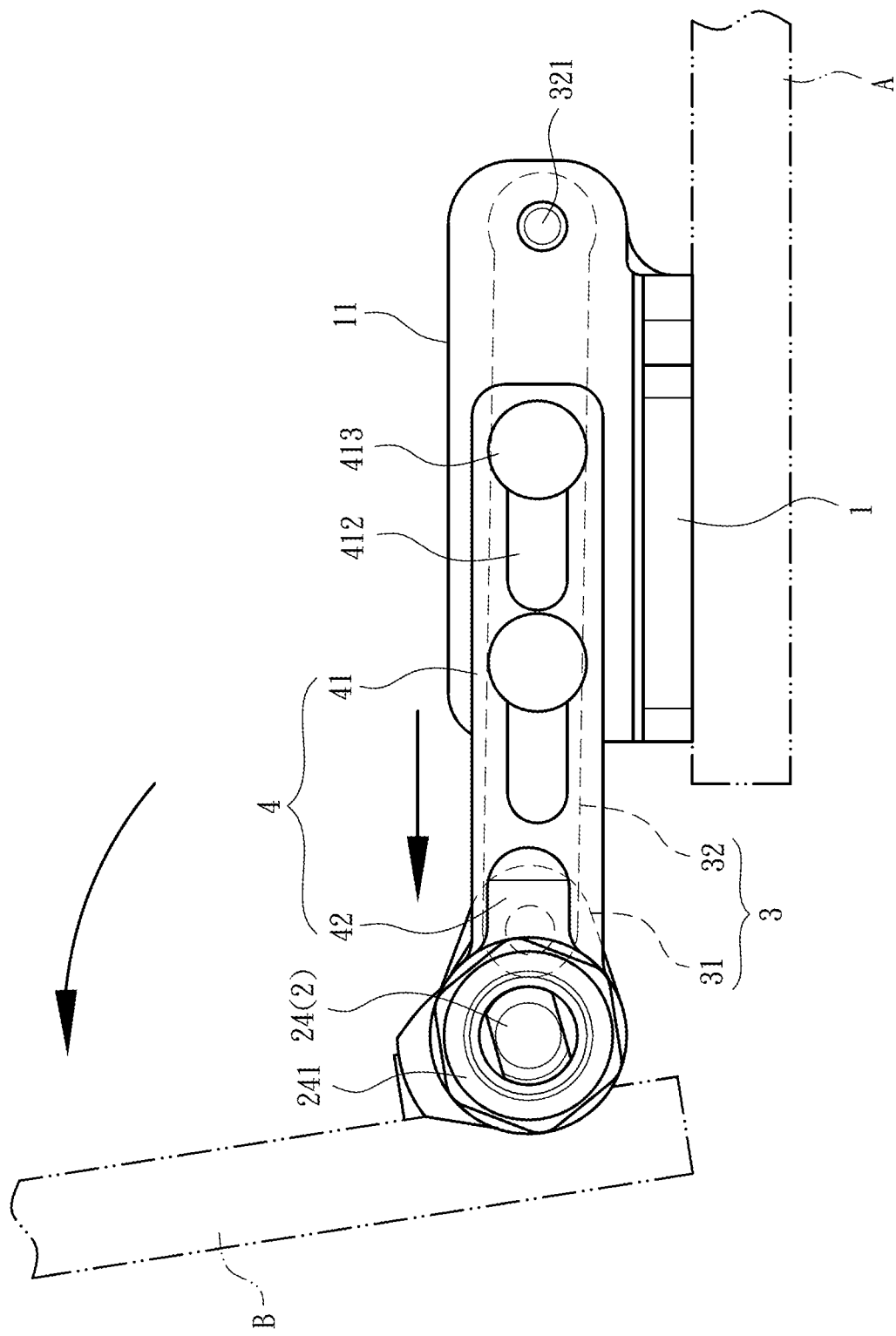
FIG. 5 is a third schematic view showing the operation of the present invention.

FIGS. 3-5 illustrate the operation of the above structure of the present invention when in use. When the movable unit B is fully closed relative to the immovable unit A, the joint between the first connecting rod 31 and the second connecting rod 32 is at the minimum bending angle, and the guide member 413 is located near the left end of the guide portion 412 (as shown in FIG. 3). At this time, the distance (the total length) between the edge of the movable unit B and the edge of the immovable unit A is the smallest. When the movable unit B is gradually pivoted and lifted relative to the immovable unit A, the first connecting rod 31 of the connecting rod assembly 3 is rotated along with the rotating shaft 2, so that the bending angle of the joint between the first connecting rod 31 and the second connecting rod 32 gradually increases, and the guide member 413 is gradually moved to the middle position of the guide portion 412 (as shown in FIG. 4). At this time, the distance (the total length) between the edge of the movable unit B and the edge of the immovable unit A gradually increases. When the movable unit B is pivoted to the fully lifted position relative to the immovable unit A, the joint between the first connecting rod 31 and the second connecting rod 32 is at the maximum bending angle, and the guide member 413 is located near the right end of the guide portion 412 (as shown in FIG. 5). At this time, the distance (the total length) between the edge of the movable unit B and the edge of the immovable unit A is the largest, so that the heat generated from the internal operation of the immovable unit A can be dissipated to the outside.

In the actual operation of the above structure, because the elastic member assembly 50 and the friction members 51, 52, 53 of the torsion assembly 5 are disposed at one side of the guide rod 41 of the guide assembly 4, close to the locking member 241 (the locking end 24), the above-mentioned parts generate greater frictional resistance. The first connecting rod 31 and the stopper 33 of the connecting rod assembly 3 are driven synchronously and generate less frictional resistance with the adjacent stop flange 21 and the guide rod 41. Therefore, the force applied in operation can be reduced, and the wear between the connecting rod assembly 3 (the first connecting rod 31) and the adjacent assembly can be reduced.

Furthermore, because the first connecting rod 31 has the notch 312, the first end of the second connecting rod 32 won't be clamped by the bottom of the notch 312 of the first connecting rod 31 and the stopper 33. The second connecting rod 32 has the smallest contact friction area and the lowest friction resistance with the adjacent assembly in the pivoting process, which can further increase the service life of the entire connecting rod assembly 3.

Based on the above, the displaceable rotating shaft structure and the foldable device having the rotating shaft structure provided by the present invention can achieve the adjustment of the distance between the two rotating shafts as the two parts of the electronic device are opened and closed. In the process of operation, each linking mechanism keeps the minimum friction, so as to improve the service life of the whole mechanism. Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A displaceable rotating shaft structure, comprising:
    a support (1), the support (1) having a supporting portion (11);
    a rotating shaft (2), one end of the rotating shaft (2) having a linking section (22), the other end of the rotating shaft (2) having a fixed section (23);
    a connecting rod assembly (3), includes a first connecting rod (31) and a second connecting rod (32) having a first end pivotally connected to the first connecting rod (31), one end of the first connecting rod (31) spaced from the pivotal connection to the second connecting rod (32) is defined as the first outer end (31a) and is connected to the linking section (22) and synchronously rotates therewith, a second end of the second connecting rod (32), spaced from the first connecting rod (31) is defined as the second outer end (32a) is pivotally connected to the supporting portion (11);
    a guide assembly (4), having a guide rod (41), one end of the guide rod (41) being pivotably connected to the linking section (22) and located between the connecting rod assembly (3) and a torsion assembly (5), the guide rod (41) having at least one guide portion (412), the guide portion (412) being configured to guide the guide rod (41) to slide relative to the supporting portion (11);
    the torsion assembly (5), coupled to the linking section (22) and located between the guide rod (41) and one end of the linking section (22) away from the fixed section (23), the torsion assembly (5) being configured to provide a pivoting torsion for the rotating shaft (2);
    wherein when the rotating shaft (2) is rotated relative to the support (1), the rotating shaft (2) drives the connecting rod assembly (3) to change an angle between the first connecting rod (31) and the second connecting rod (32) and a total linear distance between the first outer end (31a) and the second outer end (32a) relative to the rotating shaft (2), a distance between the rotating shaft (2) and the support (1) is changed through the guide assembly (4), the torsion assembly (5) and the connecting rod assembly (3) are spaced by the guide assembly (4) so that the torsion assembly (5) and the connecting rod assembly (3) can be driven under low frictional resistance.

2. The displaceable rotating shaft structure as claimed in claim 1, wherein the supporting portion (11) has at least one guide member (413) and a pivot hole (13); the second outer end (32a) of the connecting rod assembly (3) is pivotally connected to the pivot hole (13) via a pivot member (321); the guide portion (412) is a guide groove for receiving the guide member (413).

3. The displaceable rotating shaft structure as claimed in claim 2, wherein the torsion assembly (5) is composed of an elastic member assembly (50) and at least one friction member (51, 52, 53), the elastic member assembly (50) is configured to generate an elastic force on the at least one friction member (51, 52, 53) along an axial direction of the rotating shaft (2) to increase friction between the at least one friction member (51, 52, 53) and between the friction member (51) the guide assembly (4).

4. A foldable device having the rotating shaft structure as claimed in claim 2, wherein the support (1) is coupled to a preset immovable unit (A) of an electronic device, and the fixed section (23) of the rotating shaft (2) is coupled to a preset movable unit (B) of the electronic device.

5. The displaceable rotating shaft structure as claimed in claim 1, wherein an end of the first connecting rod (31) close to the second connecting rod (32) has a notch (312), a pivot portion (313) is disposed in the notch (312) and pivotally connect to the second connecting rod (32), a stopper (33) is connected to one side of the notch (312), the stopper (33) covers the pivot portion (313), and a depth (C) between a bottom of the notch (312) and the stopper (33) is greater than a thickness (D) of the second end of the second connecting rod (32), so that when the second connecting rod (32) is pivoted, the second connecting rod (32) will not rub against the bottom of the notch (312) and the stopper (33).

6. The displaceable rotating shaft structure as claimed in claim 5, wherein the torsion assembly (5) is composed of an elastic member assembly (50) and at least one friction member (51, 52, 53), the elastic member assembly (50) is configured to generate an elastic force on the at least one friction member (51, 52, 53) along an axial direction of the rotating shaft (2) to increase friction between the at least one friction member (51, 52, 53) and between the friction member (51) the guide assembly (4).

7. The displaceable rotating shaft structure as claimed in claim 5, wherein the guide assembly (4) further includes a linking member (42) pivotally connected to the linking section (22), one side of the linking member (42), facing the guide rod (41), has a protrusion (422), the guide rod (41) has a linking portion (414), the protrusion (422) is engaged in the linking portion (414) so that the linking member (42) is connected to the guide rod (41) to be driven synchronously, and at least one friction member (52) is disposed between the linking member (42) and an elastic member assembly (50).

8. The displaceable rotating shaft structure as claimed in claim 7, wherein at least one first engaging portion (423) is disposed on a surface of the linking member (42), a second engaging portion (522) is disposed on the at least one friction member (52), and the second engaging portion (522) is engaged with the second engaging portion (423).

9. The displaceable rotating shaft structure as claimed in claim 5, wherein the linking section (22) has a non-circular radial cross-section, the first outer end (31*a*) of the first connecting rod (31) has a linking hole (311) corresponding in shape to the non-circular radial cross-section of the linking section (22), after the linking section (22) is insertedly connected to the linking hole (311), the first connecting rod (31) is pivoted synchronously along with rotation of the rotating shaft (2).

10. A foldable device having the rotating shaft structure as claimed in claim 5, wherein the support (1) is coupled to a preset immovable unit (A) of an electronic device, and the fixed section (23) of the rotating shaft (2) is coupled to a preset movable unit (B) of the electronic device.

11. The displaceable rotating shaft structure as claimed in claim 1, wherein the end of the linking section (22), away from the fixed section (23), is defined as a locking end (24), and a locking member (241) is provided on the locking end (24).

12. The displaceable rotating shaft structure as claimed in claim 1, wherein the torsion assembly (5) is composed of an elastic member assembly (50) and at least one friction member (51, 52, 53), the elastic member assembly (50) is configured to generate an elastic force on the at least one friction member (51, 52, 53) along an axial direction of the rotating shaft (2) to increase friction between the at least one friction member (51, 52, 53) and between the friction member (51) the guide assembly (4).

13. The displaceable rotating shaft structure as claimed in claim 12, wherein the guide assembly (4) further includes a linking member (42) pivotally connected to the linking section (22), one side of the linking member (42), facing the guide rod (41), has a protrusion (422), the guide rod (41) has a linking portion (414), the protrusion (422) is engaged in the linking portion (414) so that the linking member (42) is connected to the guide rod (41) to be driven synchronously, and the at least one friction member (52) is disposed between the linking member (42) and the elastic member assembly (50).

14. The displaceable rotating shaft structure as claimed in claim 13, wherein at least one first engaging portion (423) is disposed on a surface of the linking member (42), a second engaging portion (522) is disposed on the at least one friction member (52), and the second engaging portion (522) is engaged with the second engaging portion (423).

15. The displaceable rotating shaft structure as claimed in claim 12, wherein the linking section (22) has a non-circular radial cross-section, the at least one friction member (51, 52, 53) has a linking hole (511, 521, 531) corresponding in shape to the non-circular radial cross-section of the linking section (22), after the linking section (22) is insertedly connected to the linking hole (511, 521, 531), the friction member (51, 52, 53) is rotated along with the rotating shaft (2).

16. The displaceable rotating shaft structure as claimed in claim 1, wherein the guide assembly (4) further includes a linking member (42) pivotally connected to the linking section (22), one side of the linking member (42), facing the guide rod (41), has a protrusion (422), the guide rod (41) has a linking portion (414), the protrusion (422) is engaged in the linking portion (414) so that the linking member (42) is connected to the guide rod (41) to be driven synchronously, and at least one friction member (52) is disposed between the linking member (42) and an elastic member assembly (50).

17. The displaceable rotating shaft structure as claimed in claim 16, wherein at least one first engaging portion (423) is disposed on a surface of the linking member (42), a second engaging portion (522) is disposed on the at least one friction member (52), and the second engaging portion (522) is engaged with the second engaging portion (423).

18. The displaceable rotating shaft structure as claimed in claim 17, wherein the linking section (22) has a non-circular radial cross-section, the at least one friction member (51, 52, 53) has a linking hole (511, 521, 531) corresponding in shape to the non-circular radial cross-section of the linking section (22), after the linking section (22) is insertedly connected to the linking hole (511, 521, 531), the friction member (51, 52, 53) is rotated along with the rotating shaft (2).

19. The displaceable rotating shaft structure as claimed in claim 16, wherein the linking section (22) has a non-circular radial cross-section, the at least one friction member (51, 52, 53) has a linking hole (511, 521, 531) corresponding in shape to the non-circular radial cross-section of the linking section (22), after the linking section (22) is insertedly connected to the linking hole (511, 521, 531), the friction member (51, 52, 53) is rotated along with the rotating shaft (2).

20. A foldable device having the rotating shaft structure as claimed in claim 1, wherein the support (1) is coupled to a preset immovable unit (A) of an electronic device, and the fixed section (23) of the rotating shaft (2) is coupled to a preset movable unit (B) of the electronic device.

* * * * *